United States Patent Office 3,246,110
Patented Apr. 12, 1966

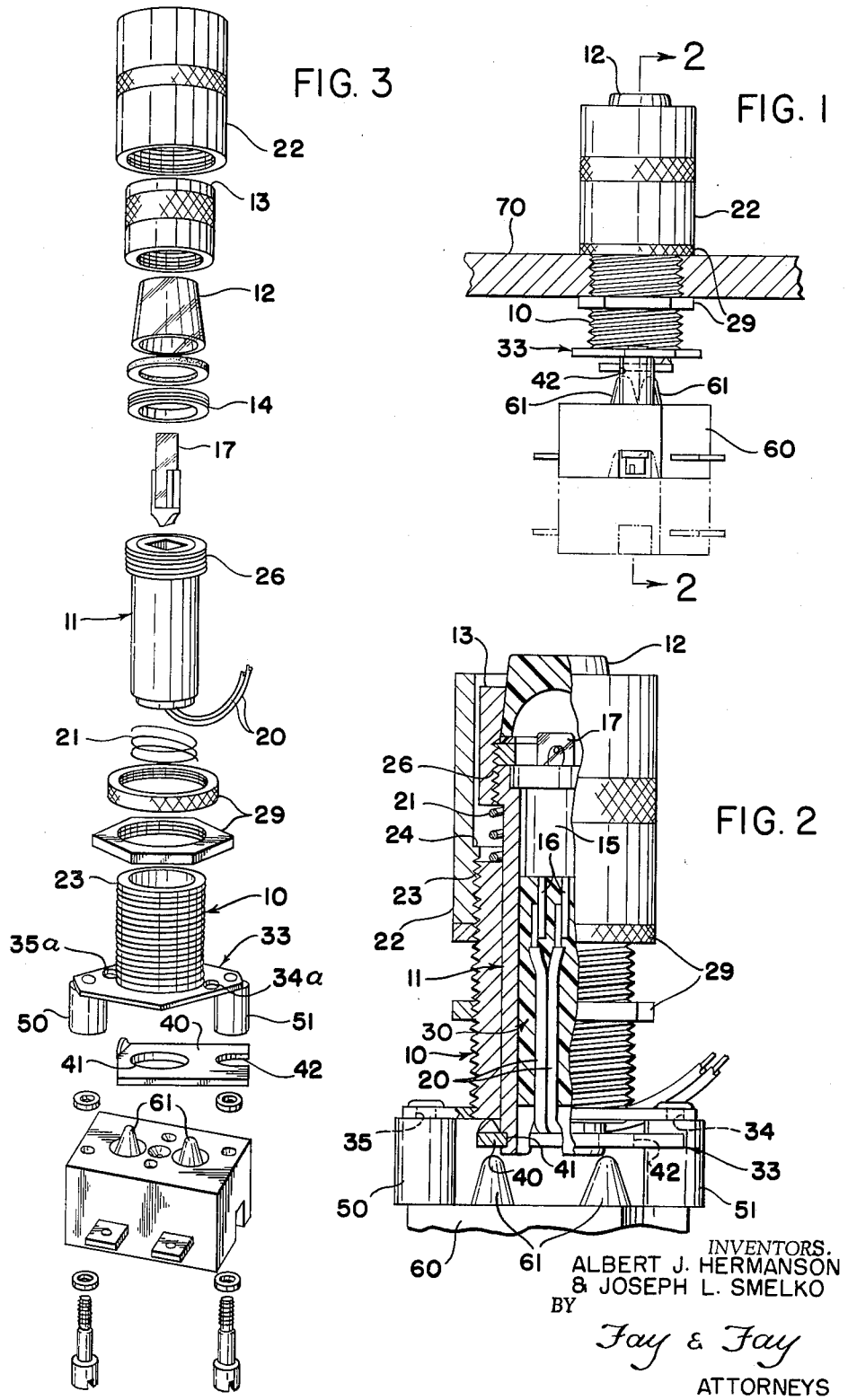

3,246,110
EXPLOSION PROOF SWITCHES INCLUDING INDICATING MEANS
Albert J. Hermanson, Parma, and Joseph L. Smelko, Brunswick, Ohio, assignors to The Adalet Manufacturing Company, Cleveland, Ohio, a corporation of Ohio
Filed July 6, 1964, Ser. No. 380,271
6 Claims. (Cl. 200—167)

This invention relates generally to electric switches, and, more particularly, to explosion proof push-button switches of the self-indicating type.

There has existed a long, heretofore unfilled need in hazardous areas, having highly flammable gaseous or vaporous ambient conditions, for an explosion proof, push-button pilot light type switch. Heretofore explosion proof, dust tight station boxes have been utilized in hazardous areas. The purpose of an explosion proof, dust tight box being to contain and dissipate any explosion which occurs, due to arcing of box mounted switches, within the box itself. It should, of course, be appreciated that explosion proof, dust tight station boxes are not air tight and accordingly the gaseous atmosphere in which the box finds itself will be able to permeate the box and conduit system during cooling of the box, etc. However, the explosion proof boxes are built to sustain and dissipate explosions which occur therewithin due to ignition of the gaseous atmosphere by the arcing of the switch contacts. Moreover the use of ordinary, non-explosion proof, switches in hazardous areas has resulted in explosions, with the attendant loss of life and property, notwithstanding the fact that the switches have been covermounted in explosion proof station boxes.

Accordingly, unless an appropriate explosion proof switch is provided for use in conjunction with the aforementioned explosion proof, dust tight station box the primary purpose and reason for the utilization of an explosion proof box will have been counteracted. Therefore, it is clear that a switch, must be provided which is compatible with and complements the purpose of the explosion proof box. The appropriate switch must provide suitable flame paths to sufficiently cool any hot gases generated by a normally occurring explosion within the switch box, and accordingly prevent any further explosion in the surrounding gaseous atmosphere. In addition, the switch must provide suitable flame paths for cooling hot gases which are generated from an explosion which may occur in the lamp housing thereof, due to the ignition of the gases which have permeated the lamp chamber by an electrical fault or arcing which may occur therein.

Lastly, the switching unit mountable upon an explosion proof box should provide suitable isolating means for preventing an explosion which occurs at the switching contact area of the switch from communicating with the lamp chamber section, and vice versa. It is obvious that if suitable isolating means between potentially explosive areas, such as the lamp housing section and the switching contact area of the switch, which obviously extends within the enclosed box area, are not provided an explosion in one section may result in a chain reaction of explosions throughout the entire system. Stated another way, suitable isolating means should be provided to prevent pressure piling from occurring.

Furthermore, heretofore, the prior art has not provided an explosion proof push-button switch which is capable of indicating its condition from various angles of sight. More particularly, the prior art switches have all included, at best, a lens for observing the status of the lamp housed therein, from a position substantially over or directly in line therewith.

Also prior art switching devices have required individual mounting positions for individual switching units upon the outer box surface with the resulting increase in cost for mounting the individual switches to the station boxes, to say nothing of the greatly increased station box area required to accommodate the large number of switching units. It is to overcome these and other disadvantages of prior art switching units that this invention is dedicated.

It is an object of this invention to provide an explosion proof push-button type switch whose condition is observable at substantially all angles of sight.

It is another object of this invention to provide a push-button actuated device which is capable of concurrently triggering a plurality of vertically stacked switching units.

It is still another object of this invention to provide a push-button explosion proof switch which is capable of direct transformerless operation from a plurality of available voltages.

It is a further object of this invention to provide a push-button explosion proof switch which is easily adaptable to operate at any of a plurality of available voltages by merely changing the pilot light thereof.

It is yet another object of this invention to provide a push-button actuating device which is capable of actuating any of the many commercially available switching units.

It is another object of this invention to provide suitable isolation between potentially explosive areas of a switch, and more particularly, to isolate the switch contact arcing portion of a unit from the lamp housing area thereof.

It is still another object of this invention to provide suitable gas cooling flame paths from potentially explosive areas of the switch for cooling any gas generated by an explosion thereat to below the ignition level of the surrounding gaseous atmosphere and thereby prevent exlposions from occurring outside of the explosion proof box.

In accordance with one illustrative embodiment of the invention and here first briefly described, the invention comprises a lamp and lamp socket housed at one end of a hollow cylindrical reciprocal actuating member. The lamp is enclosed within a suitable light transmitting lens assembly which is removably attached to the lamp socket housing of the reciprocal actuation member. The actuator is concentrically mounted within a hollow cylindrical housing member which extends the length of the actuating shaft from a position removed from the lamp socket housing thereof. Spring biasing means are provided between the concentric actuator shaft and the housing member to bias the actuator in its normally uppermost position and enable the actuator to return to this uppermost position after a switch actuating operation has occurred. Means are also provided for attaching a switch contact block to the hollow cylindrical housing. The contact block is provided with push-button members spacially removed from the lowermost position of the actuator member and which are operable by the movement of the reciprocally mounted actuating member to its lowermost position by manual operation of the switch.

The above and additional objects of this invention together with the features will be more fully appreciated from the following detailed description when read with reference to the accompanying drawings, in which:

FIG. 1 is a side elevational view of an integral indicating type of an explosion proof push-button unit;

FIG. 2 is a cross-section of the side elevational view of FIG. 1 taken along lines 2—2 and bringing out the working relationship between the components making up the push-button unit;

FIG. 3 is an exploded view of the push-button unit FIG. 1 and illustrates in greater detail the various parts thereof.

Recalling initially that the invention finds its primary application for use in surroundings having highly gaseous or flammable conditions, and that it will be mounted upon the cover of an explosion proof station box, we now turn to FIGS. 1–3 for a detailed description of the novel explosion proof switching unit. Referring first to FIG. 1, there is disclosed one embodiment of the invention in the form of an integral push-button unit fixedly attached to the cover plate 70 of an explosion proof box, not fully shown. The unit is mounted with its lens 12 extending outwardly of the box for visual indication of the status of the switching elements controlled by the unit. Lens 12 is formed of translucent material, such as glass, so that the light from the bulb within the same will be visible to the operator. Lens 12 is only one element of the illuminable push-button unit which also includes the lens housing 13 and lens retaining ring 14, as better shown in FIGS. 2 and 3. Returning now to FIG. 1, an elongated annular push-button cover housing 22 is provided. The unit is fixedly held to the cover plate 70 of the explosion proof station box by annular locking means 29.

Switch 60, in this instance is of the commercially available Cutler-Hammer contact block variety, the Cutler-Hammer model being shown merely for purposes of disclosure and not to limit the scope of the invention, is removably mounted to the push-button unit with its operable switch elements 61 being actuatable by the application of a manual, downwardly directed, force being applied to the lens housing 12. In addition, a switch actuator plate 40, securely mounted for reciprocal movement with the push-button unit is provided. Furthermore, as shown in phantom at FIG. 1, a plurality of switching units similar to unit 60 may be vertically stacked in tandem therewith for concurrent actuation should this type of operation be desirable.

The actual working relationship of the elements making up the switching unit are better shown in FIGS. 2 and 3. As shown thereat, a main hollow support cylinder 10 having threads formed along the extent of its outer surface is provided. The support cylinder 10 may be made of any suitable material. Telescoped and slidably mounted within support cylinder 10 is a cylindrical hollow plunger 11. Plunger 11 is concentrically mounted within the internal bore of support cylinder 10 for reciprocal movement relative thereto. In addition a concentric annular lamp socket receptacle 26 is integrally formed at the upper end of reciprocally mounted plunger 11. As shown in FIGS. 2 and 3, the outside diameter of the annular lamp socket receptacle 26 is substantially greater than the outside diameter of the main plunger body 11 and accordingly provides an annular shoulder at the lower extremity thereof.

Lamp receptacle 15 is made of a suitable insulating material such as phenolic, and comprises a main cylindrical body having an outside diameter commensurate with the bore of plunger 11, and, further, terminates in an integrally formed concentric annular flange at its upper end. Receptacle 15 is closed at its bottom end. The upper terminating end of plunger 11 is countersunk to a depth equal to the concentric annular flange of the lamp receptacle in order to accommodate the same. Furthermore, leaf spring type terminals are provided at diametrically opposed positions along the inside of the lamp receptacle. In this manner the terminals are insulated from each other and accordingly no undesirable electrical shorting therebetween is possible. Lamp receptacle terminals 16 extend through the bottom of receptacle 15 and are provided with suitable means for connection with electrical leads.

The terminals of the receptacle are accordingly placed in circuit, by way of switch 60 or any other desired circuit arrangment, with any of the plurality of available voltages to apply a proper operating potential to lamp 17 without the use of an intermediate step-down or step-up transformer. Lamp 17, as better shown in the exploded view of FIG. 3, is of the bayonet, telephone switchboard type design, and, accordingly, has formed integrally thereto the proper slide contacts for mating and communication with the appropriate terminals 16 mounted within the lamp receptacle 15. It should here be emphasized that the invention is capable of illuminating a lamp from any of a plurality of available voltages without the use of a voltage transforming means such as has been the custom heretofore. Furthermore, by using commercially available Sylvania pilot lamps it is possible to change lamp 17 to be compatible with any of a plurality of available operating voltages.

Lens housing 13 is shown to have internal threads for mating with the threads provided along the outer surface of the lamp socket receptacle 26. As further shown in the exploded view of FIG. 3, lens housing 13 is provided with an inwardly tapered bore having a smaller diameter at its extreme upper position than at its lower position. Furthermore, for congruent mating therewith, lens 13 is designed with a similarly tapered annular construction. Lens retaining ring 14 is provided with threads for engagement with the internal threads of lens housing unit 13 to thereby prevent slipping or removal of the lens 12 relative to the housing 13. The actual operating relationship between the lamp socket receptacle 26 and the lens housing unit 13, along with the retaining ring 14 and lens 12 is shown in FIG. 1.

At this point it should be emphasized that the contiguous mating relationship between the glass lens 12 and the juxtaposed lens housing 13 provide a cooling path for any hot gases developed within the lamp receptacle of our switching unit. More particularly, if an explosion should occur within the lamp receptacle area, due to the ignition of gases which have permeated the area by arcing, which may be due to a loose electrical connection between the bayonet type lamp and its associated leaf spring type terminals or because of any other electrical fault, high temperature gases will be generated which if they are permitted to escape in an uncooled condition may result in an explosion of the surrounding gaseous atmosphere outside the explosion proof box. However, by providing a gas cooling flame path the gases which are developed within the lamp chamber will be sufficiently cooled after passing over this extensive flame path to lower the temperature thereof below the ignition temperature of the surrounding gaseous or vaporous atmosphere. An additional gas cooling flame path for the hot gases developed in the lamp receptacle portion of the switch, due to an explosion thereat, is provided by way of the threaded surfaces of lens housing 13 and lamp receptacle 26.

As shown in FIG. 2 or 3 a yieldable coil spring 21 is slidable over the external cylindrical plunger 11, and its upward movement is limited by the shoulder formed by the lamp receptacle socket 26. Accordingly, upon the insertion of the main cylindrical body of plunger 11 within the bore of support cylinder 10 yieldable coil spring 21 will bias the plunger 11 to its uppermost position. Plunger 11 is, therefore, slidably mounted within the bore of support housing 10 in a normal position as shown by FIG. 2 by the yieldable coil spring 21, which encircles the outer surface of the plunger body and is positioned between the lamp receptacle housing 26 of plunger 11 and the upper extremity of the support cylinder 10. A downwardly directed force applied to the lens 12 or lens housing 13 will result in a downward movement of the plunger 11 against the biasing force provided by coil spring 21 and upon removal of this force plunger 11 will assume its normal upward position as shown in FIG. 2.

An annular collar member 22 is utilized to provide protection for the spring and plunger member as well as for the lens housing 13. In addition, the annular collar member 22 is utilized primarily to minimize lens breakage and possible switch triggering by an accidental bumping or contact with the lens 12. Annular collar 22 is provided with a lower threaded portion 23 which terminates at an annular projection 24 at a point proximate the lower end thereof. It is thus seen that the annular collar 22 will be threadedly engageable with support housing 10 to a position limited by the annular abutment 24. This, of course, permits the collar 22 to extend to a position which still permits a sufficient exposure of the lens 12 for proper line of sight observation from substantially all important angles. Suitable locking nuts 29 are provided, as shown in FIGS. 1 and 2 to fixedly attach the unit to the cover plate of the station box. As shown, one locking nut would be positioned above, or outside, the cover pannel and the other would assume a locking relationship inside the cover.

A switch mounting plate 33, provided with a central aperture for mounting to the main elongated switch support housing 10, is shown to be fixedly secured therewith in FIGS. 1 and 2. Switch support plate 33 is provided with apertures 34 and 35 for suitable fastening of the switch contact unit 60 thereto. As discussed hereinabove, merely for purposes of illustration, a Cutler-Hammer type switch, 60, is disclosed. Switch 60 is provided with normally open upwardly projecting contacts 61 which are movable to a closed position upon a suitable downwardly directed force being applied thereto. In order to permit the switch contacts 61 to assume their full open position, spacer posts 50 and 51 are provided for mounting the switch unit 60 to the switch plate 33. As can be seen, the use of the spacer posts permits contacts 61 to assume a full open position without encountering switch plate 33. Switch contacts 61 are reciprocally mounted within switch unit 60 and are capable, upon assuming an activated or downward position, of actuating further switches which may be connected in tandem therewith, see the phantom portion of FIG. 1.

In order to make the switch universally adaptable for substantially all of the commercially available switch contact blocks, a second set of apertures 34a and 35a are provided. Accordingly, if the mounting holes on the switch contact blocks are spacially positioned a distance which is noncompatible with the outer apertures 34 and 35 which in the illustrated example are suitable for use with a Cutler-Hammer contact unit, all that is required is to re-position the spacers 50 and 51 to apertures 34a and 35a respectively and in this manner accommodate the switch contact block. By this arrangement our switch unit is capable of accommodating substantially all of the commercially available contact blocks.

In addition, a switch actuating plate 40 is provided. The switch actuator is fixedly mounted to the terminal portion of plunger member 11. As indicated, actuator plate 40 is provided with an arcuate indenture 42 along one of its sides. The purpose of the arcuate indenture or key slot is to prevent the plunger 11 from rotating and thus causing undue wear on the conductive wires 20. In any event key slot 42 is of sufficient dimension to permit the actuator plate to straddle one of the spacer posts, 50 or 51 regardless of which set of apertures on plate 33 are utilized.

As shown in FIG. 2, suitable conducting means connect the lamp receptacle terminals 16 to appropriate circuitry, and therefrom to a source of electrical potential. In this manner, the invention contemplates the use of a switch which is adaptable to be connected to various external circuit arrangements. The lamp, 17, may be used in conjunction with the switching contacts to indicate the status of the circuitry connected thereto, or the lamp may be operated independently of the switch contacts. It is of course clear that any combination of the aforementioned lamp switch contact unit relationships may be utilized. Suitable electrical connecting means, 20, are provided for interconnecting the available power source, the desired circuit connections, and the lamp receptacle terminals 16. In addition, a suitable sealing compound 30, in this case Sauereisen Plastic Porcelain No. 31 sealing compound is utilized, to isolate the lamp chamber from the switch contact chamber. In this manner any arcing which occurs at the lamp receptacle is prevented from resulting in an explosion which affects the contact chamber and vice versa.

Upon assembly of the unit, as indicated hereinabove, the unit will then be fixed to the cover plate 70 of an appropriate explosion proof station box. Fixation of the switch to the cover plate is facilitated by removal of the annular collar member 22 and the upper locking nut 29 and loosen the lower locking nut 29. The support housing 10 and plunger carried lens receptacle will then be threadedly extended through the aperture provided therefor in cover plate 70 of the station box, with the lens 12 on the outside of the cover box and the switch unit 60 being inwardly thereof. The locking nuts will then threadedly engage the support member 10 on opposite sides of cover plate 70, and accordingly, fix the unit thereto. Annular collar member 22 can then be screwed on to the support housing 10 and the unit will then only await the appropriate electrical current connection for operation.

The switch unit is now in proper condition for operation and accordingly upon a manual downwardly or inwardly directed force being applied to lens 12, or the lens housing assembly 13, plunger 11 will axially slide within the bore of support housing 10. Plunger 11 will be displaced from its normal outward position to a position wherein switch contact actuator plate 40, fixedly connected to the lower extremity of the plunger 11, will actuate switch contacts 61 of contact block 60, contact block 60 being fixedly connected to the support housing 10 by way of switch mounting plate 33. Therefore, application of a downwardly directed pressure upon lens 12 of the reciprocally mounted plunger is effective to result in an axial downward movement of the plunger, against the biasing coaxial coil spring 21. This downward movement of the plunger 11 of course results in the depression of switch contacts 61 by the downward movement of switch actuator plate 40 to initiate the desired circuitry which has been connected thereto.

Returning now to the primary application and purpose of this switch which, as was explained hereinbefore, is to complement explosion proof station boxes in highly gaseous surroundings, we find that our explosion proof switch provides at least three flame proof paths for cooling or reducing the temperature of any hot gases developed, because of an explosion which may occur either at the lamp receptacle or within the explosion proof box, from resulting in the ignition of the surrounding gaseous atmosphere. It should be recalled that the surrounding gaseous atmosphere will, under box cooling conditions, permeate the explosion proof box, of which 70 indicates a wall thereof, and accordingly upon arcing by switch contacts 61 an explosion may occur inside the box. The box is of sufficient strength and rigidity to effectively dissipate the explosion without any damage to equipment or loss of life. However, as a result of the explosion hot gases will also be generated. It is obvious that if the hot gases generated by the explosion are permitted to escape into the surrounding gaseous atmosphere that an explosion will most certainly result outwardly of the explosion proof box with an attendant loss of life and property. Our invention provides a plurality of gas temperature reducing paths which as a result of the novel structural interrelation between the parts results in the flow of the hot hot gases over and across predetermined metallic surface escape paths. Accordingly, by use of these predetermined gas flow paths the metallic surfaces are utilized as heat sinks to lower the temperature of the gases as they pass thereover.

Accordingly, any of the hot gases which are generated due to an explosion in the box will pass by way of the metallic flame proof path provided between plunger 11 and support cylinder 10, as well as the path defined by the innerface of the threads of support cylinder 10 and the mating threaded hole in the wall 70 of the box. It can, therefore, be appreciated that as the hot gases flow therebetween and find their way therethrough into the surrounding gaseous atmosphere, outwardly of the box, the temperature of the gases will be reduced below the igniting level of the surrounding gaseous atmosphere.

In addition, the structural relationship between lens 12 and lens housing 13 enables gases from the surrounding atmosphere to find their way through the space therebetween into the lamp chamber area. Accordingly, if arcing occurs within the lamp chamber area because of faulty contact conditions between the lamp 17 and its associated electrical contacts in housing 26, or for any other reason, an explosion in the lamp chamber area will result. The explosion will, of course, result in the generation of hot gases which will find their way into the surrounding gaseous atmosphere by way of paths provided between lens 12 and lens housing unit 13, as well as through the threaded portion which mounts lens housing 13 to the lamp receptacle portion 26 of plunger 11. However, because of the length of these paths the temperature of the gases will be reduced to a sufficient level to prevent an explosion from occurring in the surrounding gaseous atmosphere.

Lastly, our invention provides suitable isolation between potentially explosive areas of the switch to prevent a chain reaction of explosions from occurring. The isolation in our invention is provided by way of sealing cement 30 which fills substantially the entire lower portion of plunger 11, therefore, any explosion which occurs in the lamp chamber area will be prevented from having any effect upon the gases which have permeated in the explosion proof box. In addition, the sealing cement 30 prevents any gases which are the result of an explosion which occurred in the explosion proof box from finding their way into the lamp receptacle area and resulting in an explosion thereat. It can, accordingly, be seen that sealing cement 30 provides the means for suitably isolating potentially explosive areas from each other and thereby prevent pressure piling from occurring.

While it will be apparent that the embodiments of this invention herein disclosed are well calculated to fulfill the objects of the invention, it will be appreciated that the invention is susceptible to modification, variation and change, without departing from the proper scope or fair meaning of the subjoined claims.

We claim:
1. An explosion proof pilot light push-button switch capable of direct operation from any of a plurality of available voltages comprising, a hollow cylindrical housing member having a threaded outer surface, a hollow cylindrical actuating member telescopically mounted concentrically within said housing member, said actuating member having a lamp receptacle integrally formed at one end thereof, said lamp receptacle being formed concentrically with and of slightly greater dimension than said actuating member to thereby form an annular shoulder portion having a threaded outer surface, said lamp receptacle having electrical terminals extending along inner opposed surfaces, said terminals extending through the receptacle into the inner chamber of said actuating member, a lamp having electrical terminals integrally formed along opposite outer surfaces thereof, said lamp being capable of direct operation from the available voltages supplied to the receptacle terminals, helical spring biasing means operatively positioned about said actuating member between said annular shoulder formed by said lamp receptacle and the upper terminal portion of said housing member into which said actuating member is telescopically positioned for biasing said actuating member to an uppermost position relative to said housing member, a plate having a plurality of apertures therein, individual ones of associated pairs of contact block accommodating apertures being equally spaced on opposite sides of a main centrally located aperture, said plate fixedly attached to the lower terminal position of said housing member by way of said main centrally located aperture, said plurality of pairs of apertures capable of accommodating substantially all of the commercially available switch contact blocks, an annular lens housing having a central aperture extending therethrough and further having a threaded lower inner surface, a lens fixedly positioned in said lens housing with its closed terminal portion projecting outwardly of said housing, said lens housing threadingly mountable to said lamp receptacle housing, an outer collar member threadedly engagable with said hollow cylindrical housing about said lens housing, exposing a substantial portion of said lens to thereby permit universal observation thereof, a switch actuating plate fixedly attached to said reciprocally mounted actuator member for reciprocal movement therewith, a switch contact block removably attachable to said switch mounting plate by way of any of the plurality of pairs of apertures therein, said contact block spacially removed from said actuator plate for operation thereby, a plurality of similar switch contact blocks attachable in tandem with said switch plate mounted contact block for concurrent operation therewith, and sealing means filling the hollow elongated chamber of said actuating member to isolate any hot gases developed in said switch contact portion of said switch from the lamp receptacle portion thereof.

2. For use with an explosion proof station box, an explosion proof pilot light push-button switch capable of direct, transformerless operation from any of a plurality of available voltages comprising, a hollow cylindrical housing member having a threaded outer surface, a hollow cylindrical actuating member telescopically mounted concentrically within said housing member, said actuating member having a lamp receptacle integrally formed at one end thereof, said lamp receptacle being formed concentrically with and of slightly greater dimension than said actuating member to thereby form an annular shoulder portion having a threaded outer surface, said lamp receptacle having electrical terminals extending along inner opposed surfaces, said terminals extending through the receptacle into the inner chamber of said actuating member, a lamp having electrical terminals integrally formed along opposite outer surfaces thereof, said lamp being capable of direct operation from the available voltages supplied to the receptacle terminals, helical spring biasing means operatively positioned about said actuating member between said annular shoulder formed by said lamp receptacle and the upper terminal portion of said housing member into which said actuating member is telescopically positioned for biasing said actuating member to an uppermost position relative to said housing member, a plate having a plurality of threaded apertures therein, individual ones of associated pairs of contact block accommodating apertures being equally spaced on opposite sides of a main centrally located aperture, said plate fixedly attached to the lower terminal position of said housing member by way of said main centrally located aperture, said plurality of pairs of apertures capable of accommodating substantially all of the commercially available switch contact blocks, an annular lens housing having a central aperture extending therethrough and further having a threaded lower inner surface, a lens fixedly positioned in said lens housing with its closed terminal portion projecting outwardly of said housing, said lens housing threadingly mountable to said lamp receptacle housing, an outer collar member threadedly engagable with said hollow cylindrical housing about said lens housing, exposing a substantial portion of said lens to thereby permit universal observation thereof, a switch actuating plate fixedly attached to said reciprocally mounted actuator member for reciprocal movement therewith, a switch contact block removably attachable to said switch mounting plate, said contact block spacially removed from said actuator plate for operation thereby, sealing means filling the hollow elongated chamber of said actuating member to isolate any hot gases developed in any portion of said switch from other portions thereof, and means for fixedly connecting said switch in a lamp observable fashion to an explosion proof box, said juxtaposed structural relationship between said lens and said lens housing, and by the threaded attachment of said lens housing with said lamp receptacle providing a cooling path for any hot gases developed due to an explosion in the lamp receptacle area; also said juxtaposed relationship between said concentrically positioned housing member and said cylindrical actuating member providing a cooling path for any hot gases developed by an explosion occurring in said explosion proof box.

3. An explosion proof pilotlight push-button switch capable of direct operation from any of a plurality of available voltages comprising, a hollow cylindrical housing member having a threaded outer surface, a hollow cylindrical actuating member telescopically mounted concentrically within said housing member, said actuating member having a lamp receptacle integrally formed at one end thereof, said lamp receptacle being formed concentrically with and of slightly greater dimension than said actuating member to thereby form an annular shoulder portion having a threaded outer surface, said lamp receptacle having electrical terminals extending along inner opposed surfaces, said terminals extending through the receptacle into the inner chamber of said actuating member, a lamp having electrical terminals integrally formed along opposite outer surfaces thereof, said lamp being capable of direct operation from the available line voltages supplied to the receptacle terminals, helical spring biasing means operatively positioned about said actuating member between said annular shoulder formed by said lamp receptacle and the upper terminal portion of said housing member into which actuating member is telescopically positioned for biasing said actuating member to an uppermost position relative to said housing member, a plate having a plurality of apertures therein, individual ones of associated pairs of contact block accommodating apertures being equally spaced about a main centrally located aperture, said plate fixedly attached to the lower terminal position of said housing member by way of said main centrally loacted aperture, said plurality of pairs of apertures capable of accommodating substantially all of the commercially available switch contact blocks, an annular lens housing having a central aperture extending therethrough and further having a threaded lower inner surfaces, a lens fixedly positioned in said housing with its closed terminal portion projecting outwardly of said housing, a lens housing threadingly mountable to said lamp receptacle housing, an outer collar member threadedly engageable with said hollow cylindrical housing to encompass said lens housing and exposing a substantial portion of said lens to thereby permit universal observation thereof, a switch actuating plate fixedly attached to said reciprocally mounted actuator member for reciprocal movement therewith, a switch contact block removably attachable to said switch mounting plate by way of any of the plurality of pairs of apertures therein, said contact block spacially removed from said actuator plate for operation thereby, sealing means filling the hollow elongated chamber of said actuating member to isolate said switch contact portion of said switch from any hot gases developed in said lamp receptacle portion thereof.

4. For use with an explosion proof station box, an explosion proof self-indicating push-button switch capable of transformerless, direct operation from any of a plurality of commercially available line voltages comprising, a hollow cylindrical housing member having a threaded outer surface, a hollow cylindrical actuating member telescopically mounted concentrically within said housing member, said actuating member having a lamp receptacle integrally formed at one end thereof, said lamp receptacle having electrical terminals extending along inner opposed surfaces, said terminals extending through the receptacle into the inner chamber of said actuating member, a lamp having electrical terminals integrally formed along opposite outer surfaces thereof, said lamp being capable of direct operation from the commercially available line voltages supplied to the receptacle terminals, spring means biasing said actuating member to an outer position away from said housing member, a plate having a plurality of pairs of threaded apertures therein equally spaced about a main centrally located aperture, said plate fixedly attached to the lower terminal position of said housing member by way of said main centrally located aperture, said plurality of pairs of threaded apertures being capable of accommodating substantially all of the commercially available switch contact blocks, an annular lens housing having a central aperture extending therethrough, a lens fixedly positioned in said lens housing with its closed terminal portion projecting outwardly of said housing, said lens housing mounted to said hollow cylindrical actuacting member, exposing a substantial portion of said lens to thereby permit universal observation thereof, a switch actuating plate fixedly attached to said reciprocally mounted actuator member for reciprocal movement therewith, a switch contact block removably attachable to said switch mounting plate, said contact block spacially removed from said actuator plate for operation thereby, a plurality of similar switch contact blocks attachable in tandem with said switch plate mounted contact block for concurrent operation therewith, and sealing means filling the hollow elongated chamber of said actuating member to isolate hot gases developed in one portion of said switch from other portions thereof, an explosion proof box, and means for fixedly mounting said switch, in a lamp observable fashion, to an explosion proof box, said juxtaposed relationship between said lens and said lens housing, and between said telescopically positioned actuating member and said cylindrical housing member providing gas cooling flame paths to reduce the temperature of gases generated by an explosion to below the ignition temperature of the box surrounding gaseous atmosphere and thereby prevent an explosion outside the box or switch proper.

5. For use with an explosion proof station box, an explosion proof self-indicating push-button switch capable of transformerless, direct operation from any of a plurality of available voltages comprising, a hollow cylindrical housing member having a threaded outer surface, a hollow cylindrical actuating member telescopically mounted concentrically within said housing member, said actuating member having a lamp receptacle integrally formed at one end thereof, said lamp receptacle having electrical terminals extending along inner opposed surfaces, said terminals extending through the receptacle into the inner chamber of said actuating member, a lamp having electrical terminals being capable of direct operation from the commercially available line voltages supplied to the receptacle terminals, spring means biasing said actuating member to an outer position away from said housing member, a plate having a plurality of pairs of apertures therein equally spaced about a main centrally located aperture, said plate fixedly attached to the lower terminal position of said housing member by way of said main centrally located aperture, said plurality of pairs of apertures being capable of accommodating substantially all of the commercially available switch contact blocks, an annular lens housing having a central aperture extending therethrough, a lens positioned in said lens housing with its closed terminal portion projecting outwardly of said housing, said lens housing mounted to said hollow cylindrical actuating member, an outer collar member threadedly engageable with said hollow cylindrical housing about said lens housing, exposing a substantial portion of said lens to thereby permit universal observation thereof, a switch actuating plate fixedly attached to said reciprocally mounted actuator member for reciprocal movement therewith, a switch contact block removably attachable to said switch mounting plate, said contact plate spacially removed from said actuator plate for operation thereby, sealing means filling the hollow elongated chamber of said actuating member to isolate hot gases developed in one portion of said switch from other portions thereof, an explosion proof box, and means for mounting said switch, in a lamp observable fashion, to an explosion proof box, said juxtaposed relationship between said lens and said lens housing, and between said telescopically positioned actuating member and said cylindrical housing member providing gas cooling flame paths to reduce the temperature of gases generated by an explosion to below the ignition temperature of the box surrounding gaseous atmosphere and thereby prevent an explosion outside the box or switch proper.

6. An explosion proof pilot light push-button switch capable of transformerless, direct operation from any of a plurality of available voltages by substituting proper voltage rated lamps in conformity with available voltage, comprising, a hollow cylindrical housing member having a threaded outer surface, a hollow cylindrical actuating member slidably mounted concentrically within said housing member, said actuating member having a lamp receptacle integrally formed at one thereof, said receptacle having electrical terminals extending along inner opposed surfaces, said terminals extending through the receptacle into the inner chamber of said actuating member, a lamp having electrical terminals integrally formed along opposite outer surfaces thereof, said lamp being capable of direct operation from the available voltages supplied to the receptacle terminals, spring means biasing said actuating member to an outer position away from said housing member, a plate having a plurality of apertures therein, individual ones of associated pairs of contact block accommodating apertures being equally spaced about a main centrally located aperture, said plate fixedly attached to the lower terminal position of said housing member by way of said main centrally located aperture, said plurality of pairs of apertures capable of accommodating substantially all of the commercially available switch contact blocks, a lens integrally formed on said reciprocally mounted actuator, surrounding said lamp receptacle formed thereon, a switch actuating plate fixedly attached to said reciprocally mounted actuator member for reciprocal movement therewith, a switch contact block removably attachable to said switch mounting plate by way of the plurality of apertures therein, said contact block spacially removed from said actuator plate for operation thereby, sealing means filling the hollow elongated chamber of said actuating member to isolate any hot gases developed in any portion of said switch from other portions thereof, an explosion proof box, and means for connecting said switch in a lamp observable fashion to said explosion proof box, said juxtaposed relationship between said concentrically positioned housing member and said cylindrical actuating member providing a cooling path for any hot gases developed by an explosion occuring in said explosion proof box.

No references cited.

KATHLEEN H. CLAFFY, *Primary Examiner.*